INVENTORS
ADOLFO L. FABREGAT
RAMÓN POL QUINTANA

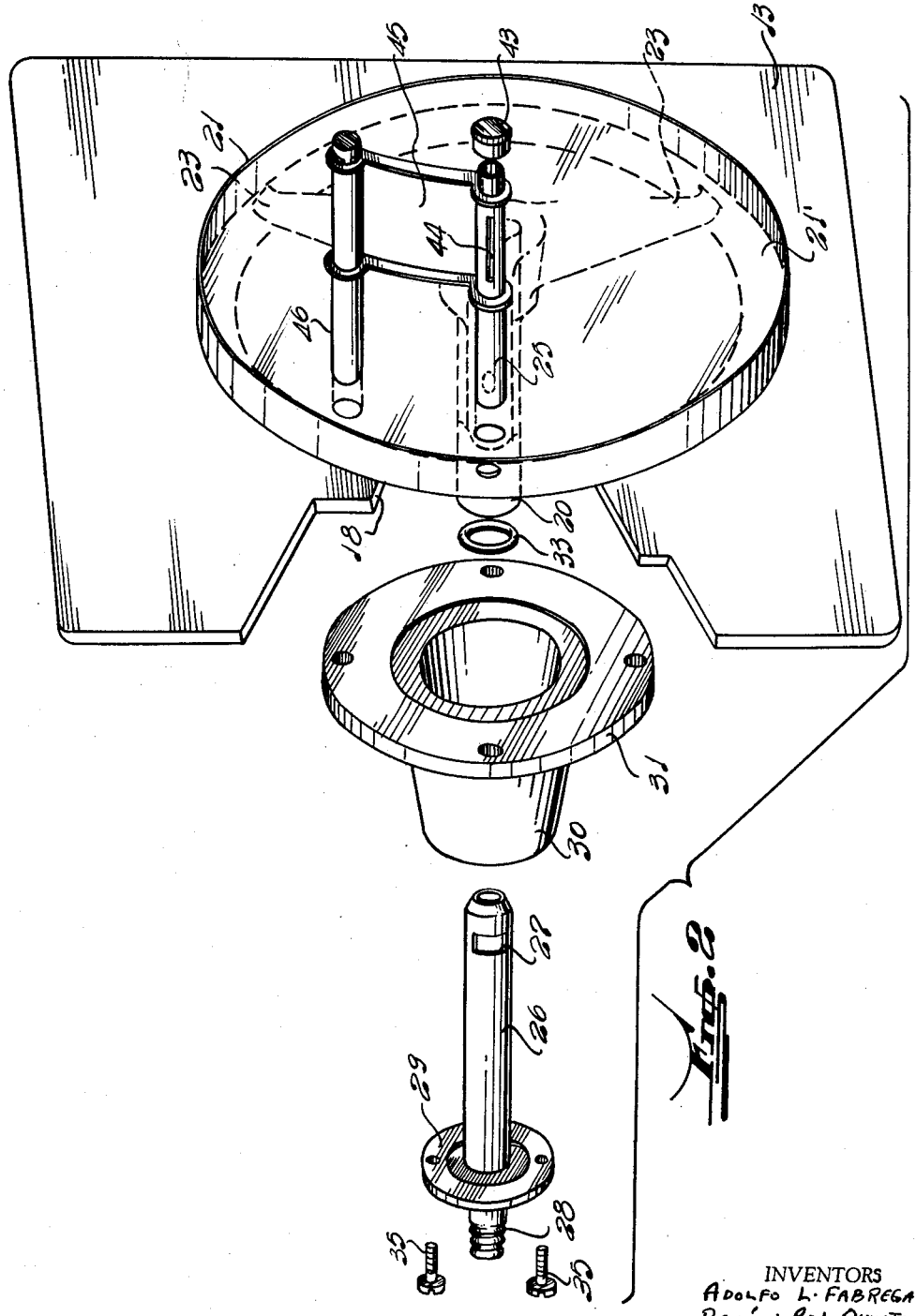

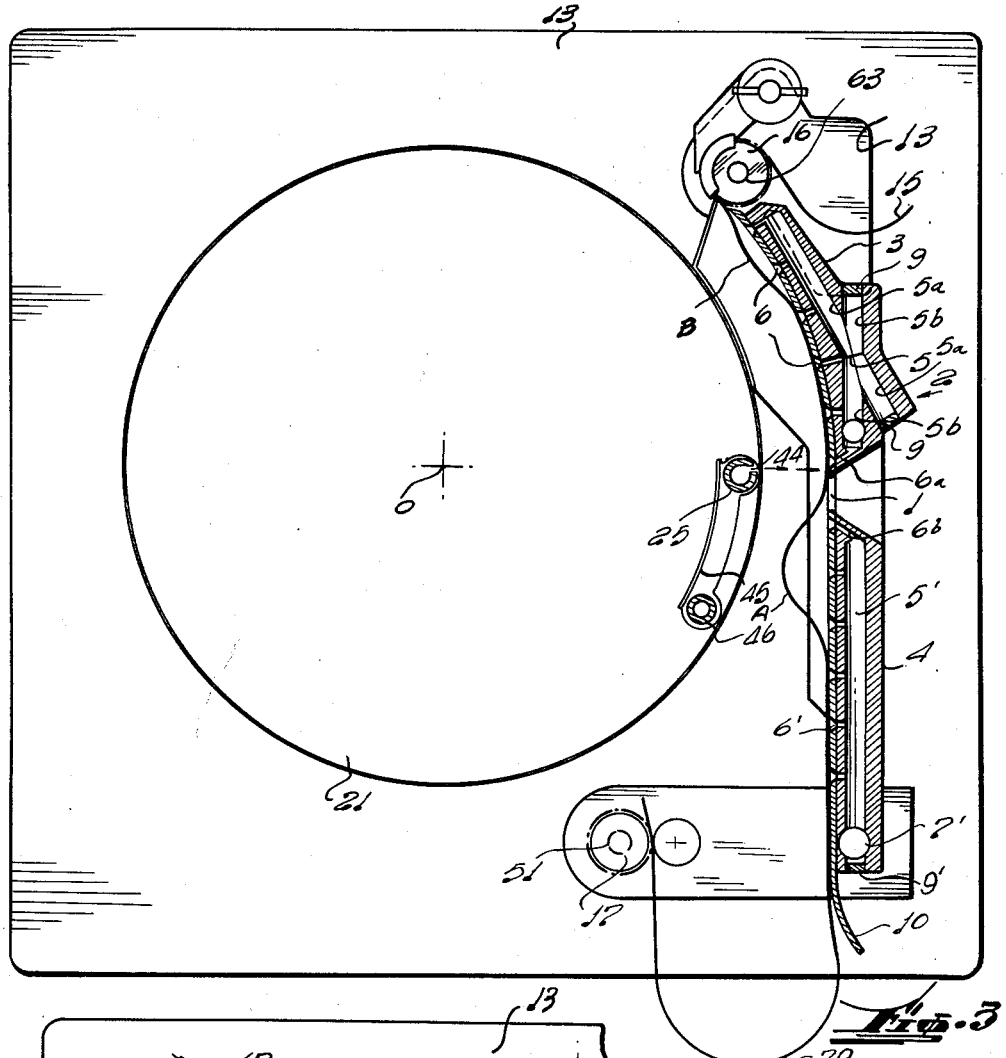
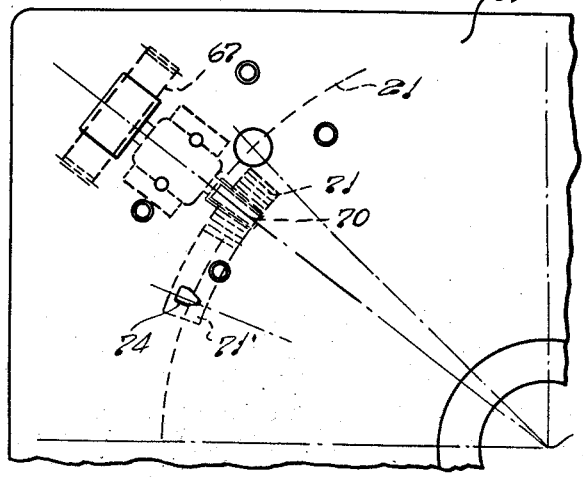

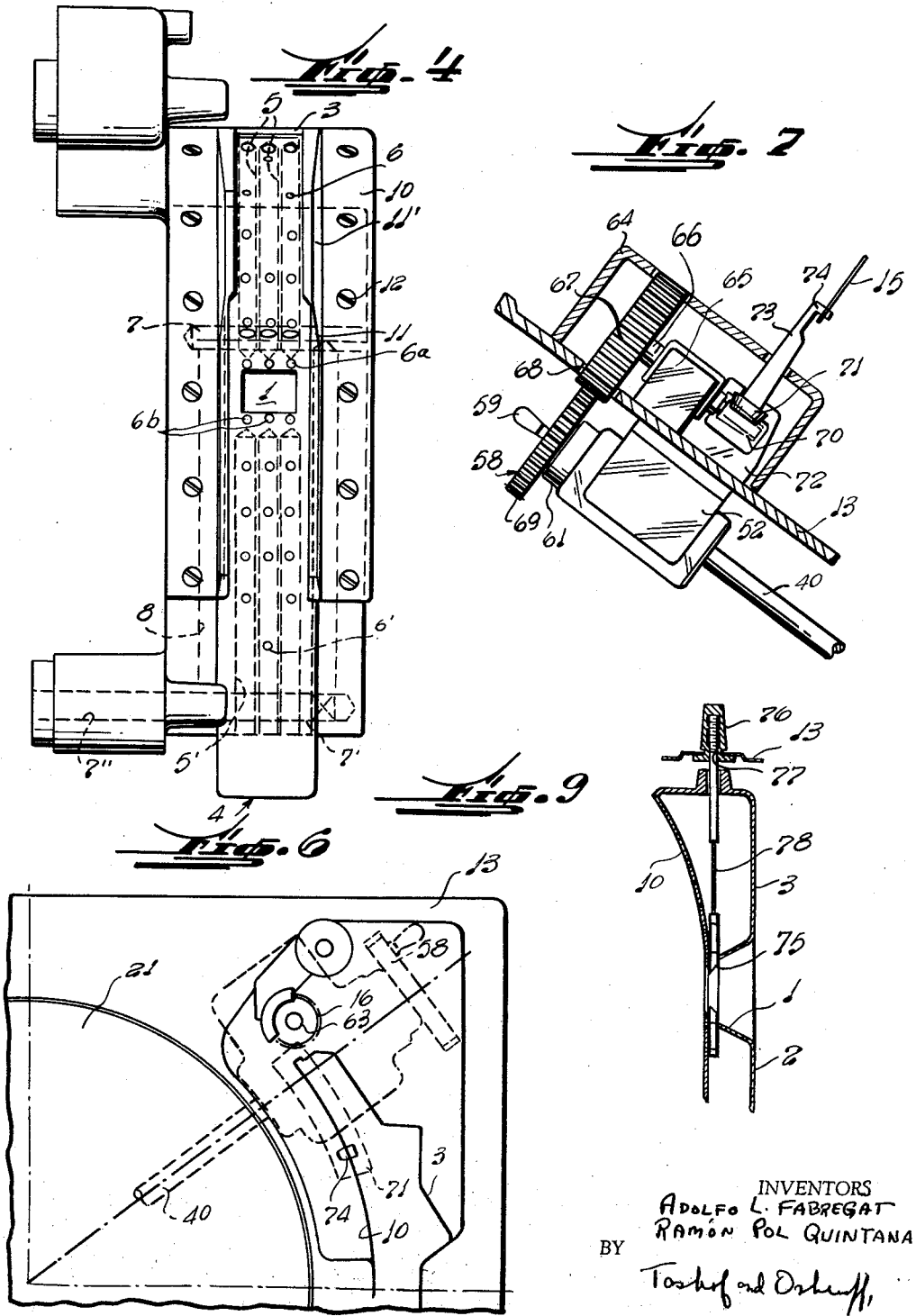

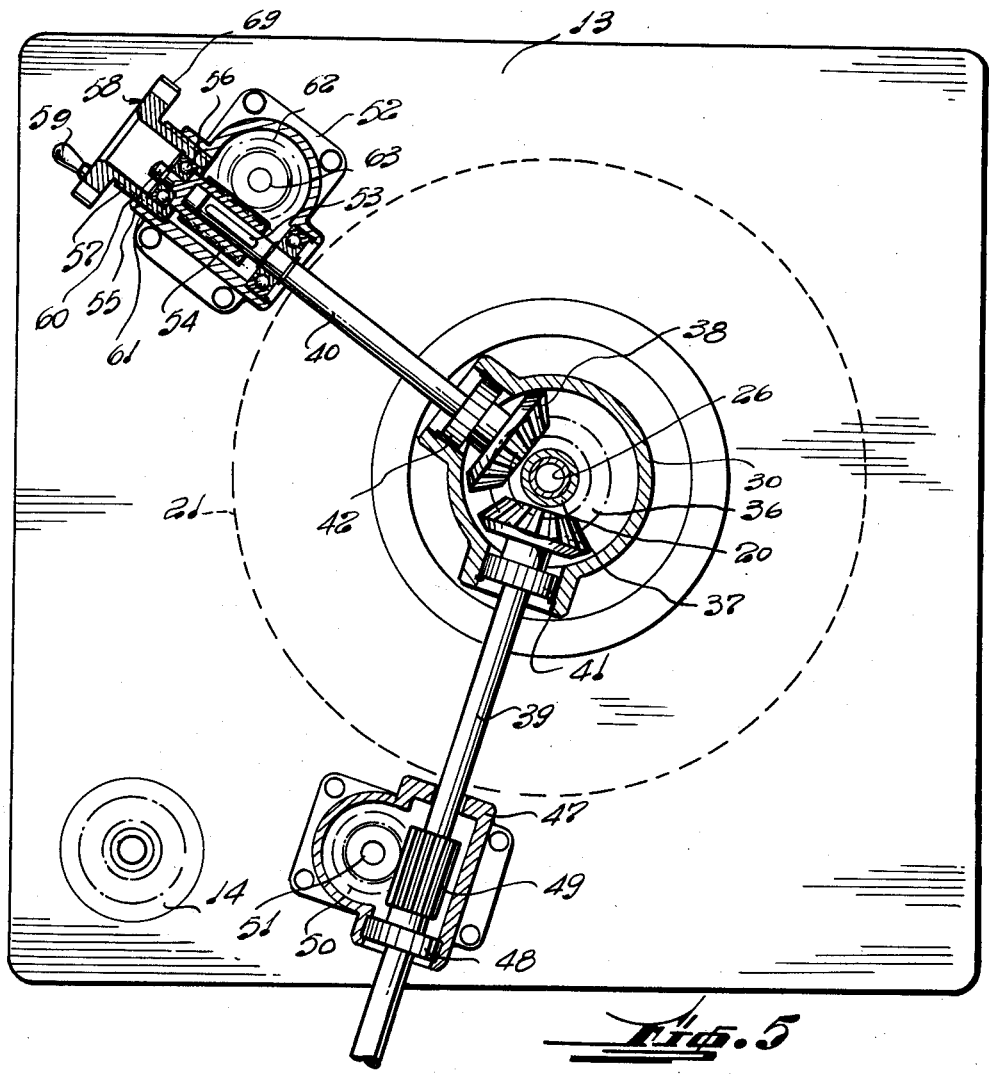

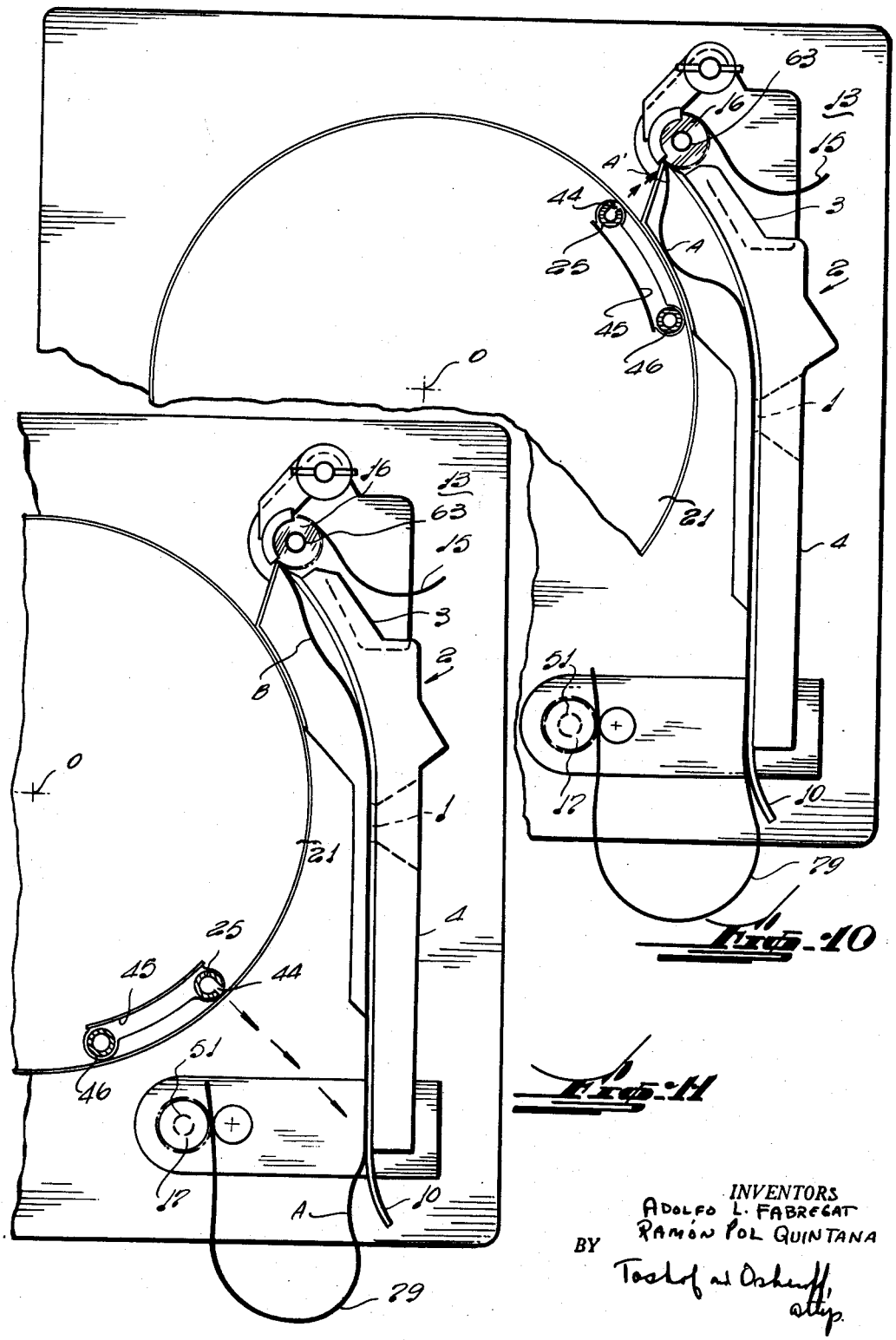

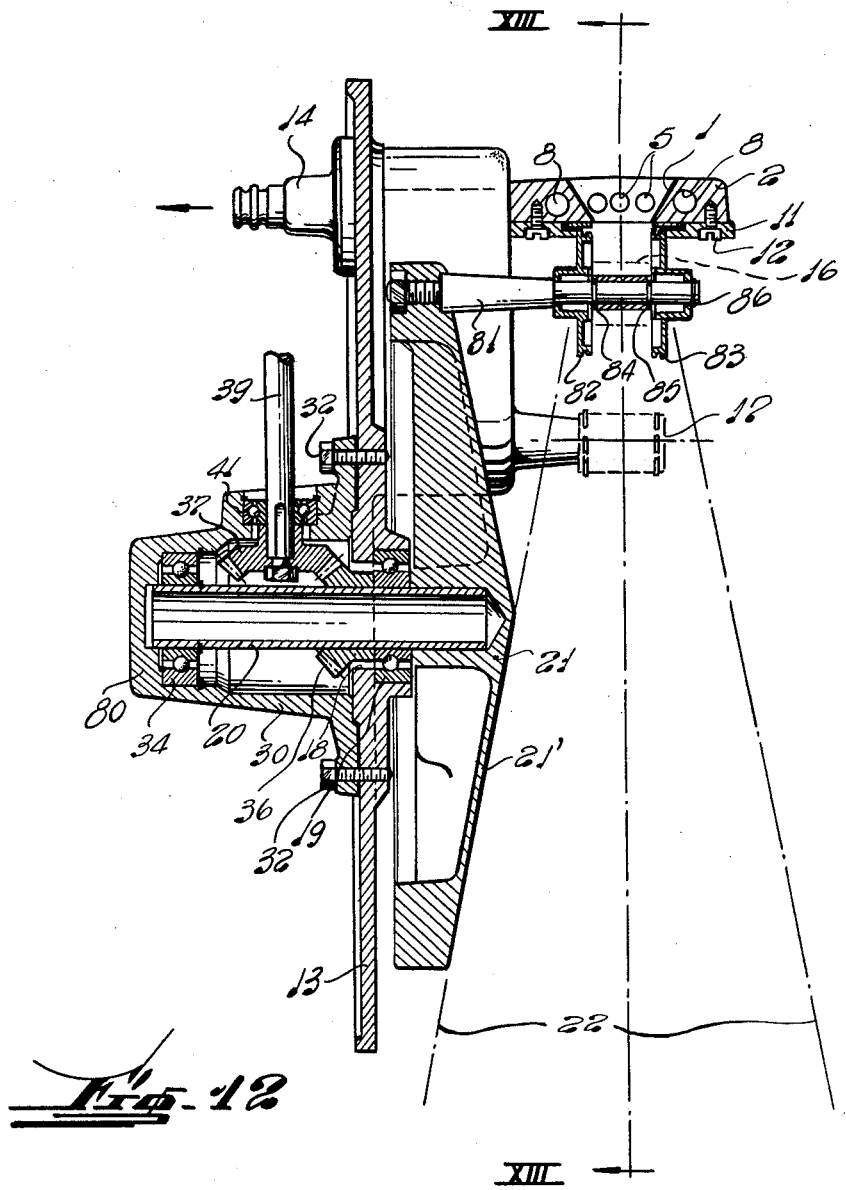

June 2, 1964  A. L. FABREGAT ETAL  3,135,159
METHOD AND APPARATUS FOR MOVING A MOTION PICTURE FILM
Filed Aug. 2, 1960  11 Sheets-Sheet 8
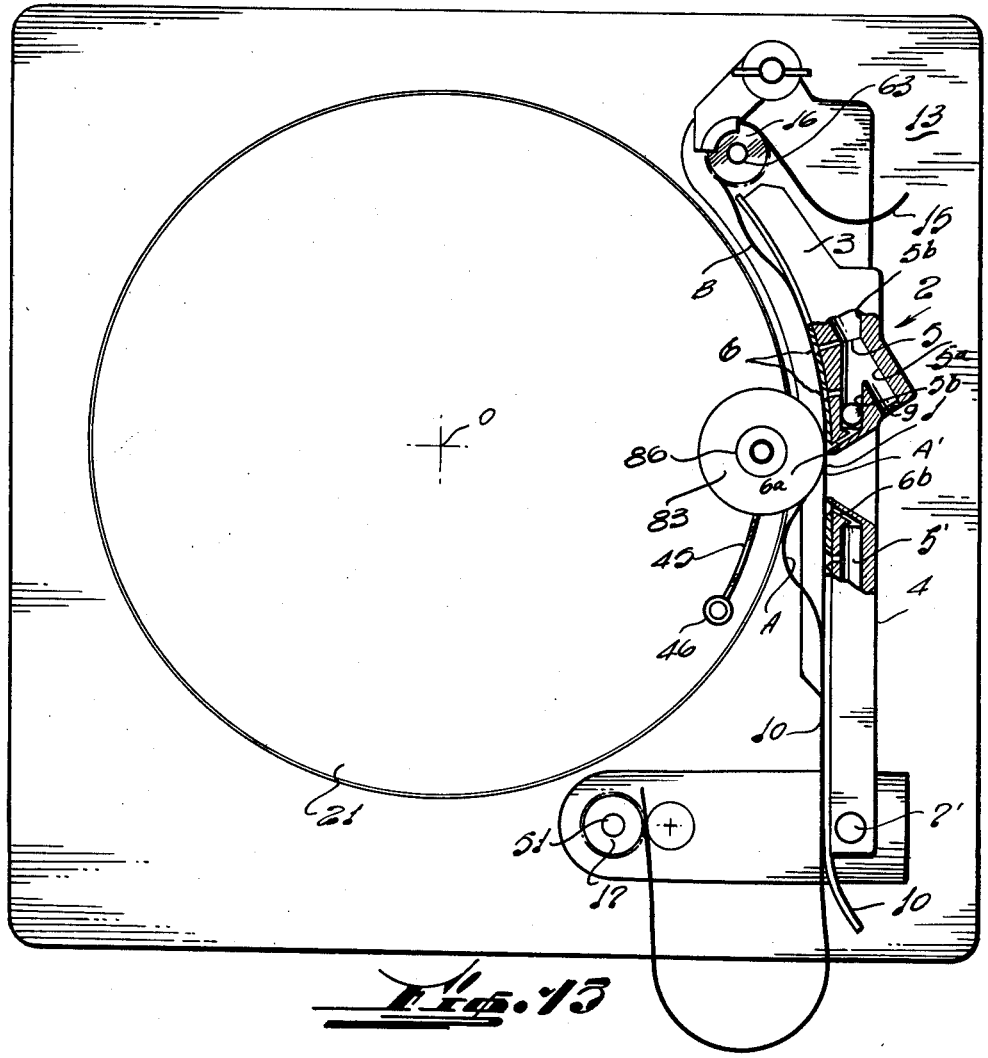
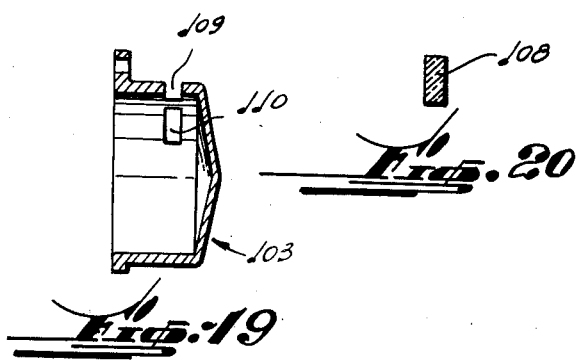
INVENTORS
ADOLFO L. FABREGAT
RAMÓN POL QUINTANA
BY

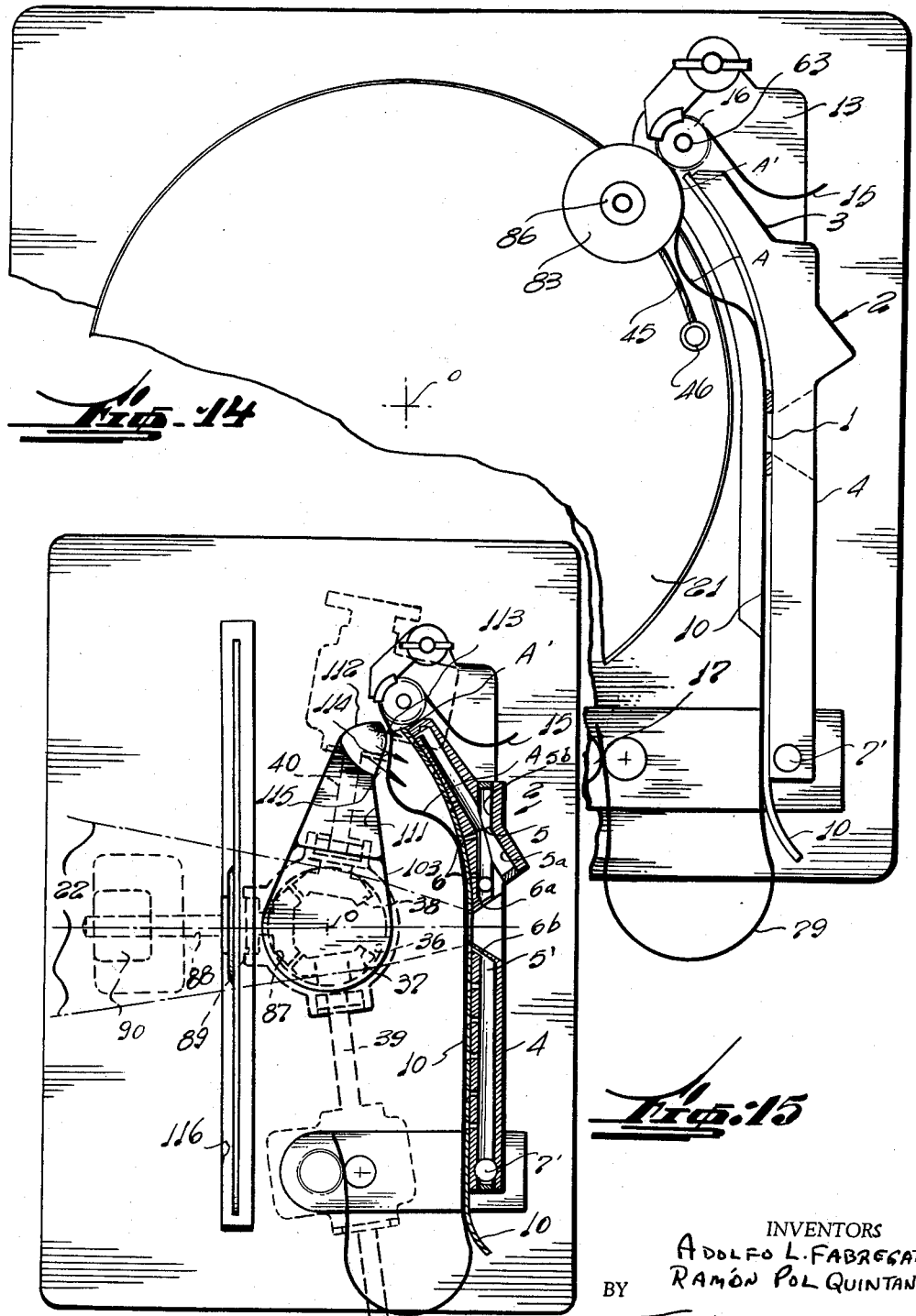

June 2, 1964    A. L. FABREGAT ETAL    3,135,159
METHOD AND APPARATUS FOR MOVING A MOTION PICTURE FILM
Filed Aug. 2, 1960    11 Sheets-Sheet 10

*Fig. 16*

INVENTORS
ADOLFO L. FABREGAT
BY RAMÓN POL QUINTANA
Toulmin and Oshuff,
atty

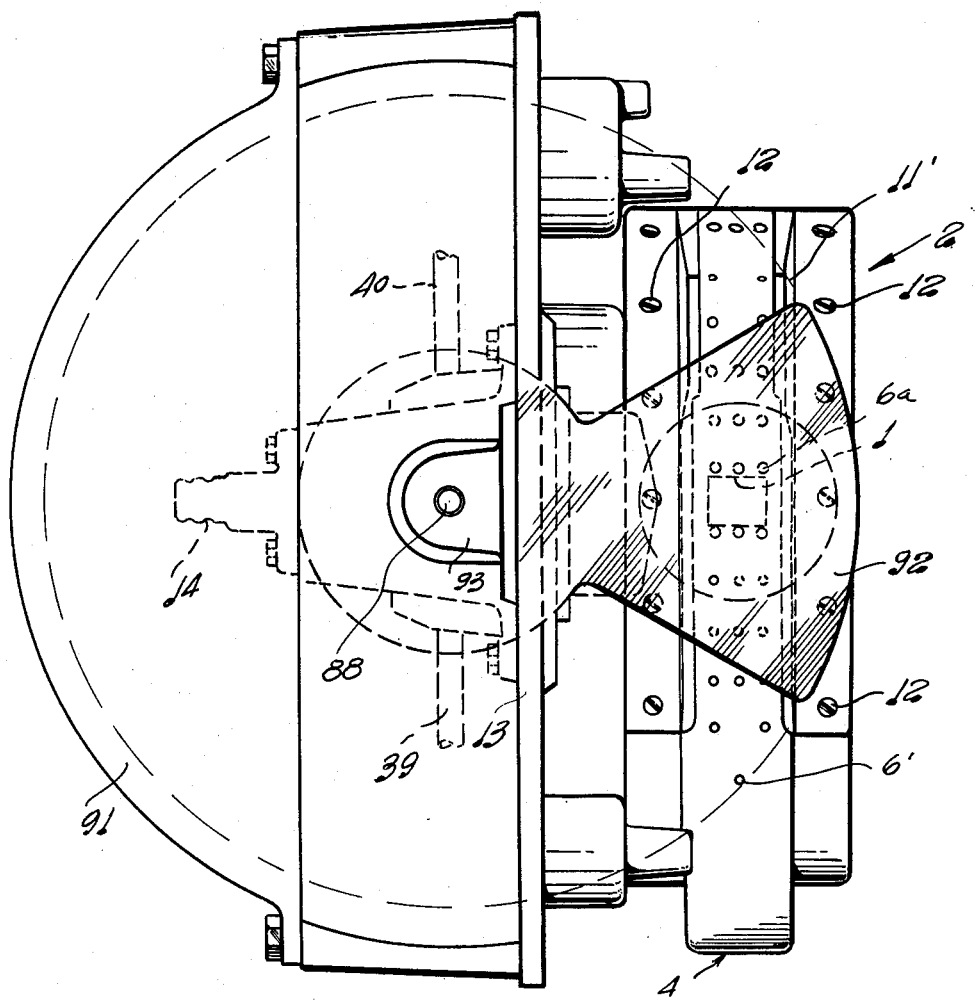

United States Patent Office 3,135,159
Patented June 2, 1964

3,135,159
METHOD AND APPARATUS FOR MOVING A MOTION PICTURE FILM
Adolfo L. Fabregat, Yi 1330, 1st Floor, Apt. 2, and Ramón Pol Quintana, Pantaleon Artigas 3677, both of Montevideo, Uruguay, assignors of one-third to Kurt Kubler, Montevideo, Uruguay
Filed Aug. 2, 1960, Ser. No. 47,054
21 Claims. (Cl. 88—18)

This invention relates to a method for moving a motion picture film in front of the aperture plate of a camera or projector and to a driving device for a motion picture film which may be used in a camera as well as in a projector; more particularly the present invention relates to a driving device which does not require a claw or a Maltese cross to move the film forward.

The driving devices so far known for moving motion picture films require that at least one side edge of the film has sprocket holes or perforations which mesh either with an intermittent pull-down claw operated by a cam or a Maltese cross arrangement in order to move the film forward, and in addition there is usually an upper and a lower sprocket wheel, as is well known to those skilled in the art. It quite often happens that the sprocket holes of the film become damaged, so that a good operator has to revise each film rather frequently in order to cut out defective parts and splice the film again. In addition in these known arrangements, cameras as well as projectors need a pressure shoe which cooperates with the aperture plate to press the film thereagainst. This requires frequent cleaning to avoid scratching of the film and in addition each time a new film is to be threaded, the picture gate has to be opened and this in turn may, by careless handling, soil the projector lens.

Furthermore in the case of projectors, when a film having defective sprocket holes is used, it often happens that either the upper loop or the lower loop of the film gets out of register and only very skilled operators can eliminate the need for stopping the projector for readjustment during projection.

The present invention has overcome all these drawbacks due to the fact that the driving device moves the film forward without any claw, Maltese cross or similar arrangements. According to this invention a film without sprocket holes could be used, although in a fully developed embodiment, as will be later seen, the sprocket holes may be used to automatically assure that the picture frame is always framed.

The driving device according to the present invention may be a pneumatic or a mechanical arrangement and it could even be conceived that such an arrangement is operated by electromagnetic forces, although the details of such an arrangement have still not been developed and are only mentioned to define the basic concept of the invention, as will be apparent later on.

The present invention consists chiefly in increasing the length of the aperture plate, above and preferably below the window, forming a buckle or hump of the film on the aperture plate above the window and then move said buckle forward, synchronized with the shutter crossing the window and to then form a next buckle similar to the first buckle, so that the film moves forward with a motion similar to that of a caterpillar. In other words, the moving part of the film is lifted from the aperture plate and carries out its forward movement, so to say in the air, thereby avoiding scratching and the other cited drawbacks.

The expression "buckle" intends to define a portion of the filmband which is lifted defining a more or less "wavelike" portion, which could also be defined as a "hump" or a "ruck."

It is an object of the present invention to provide a better luminosity, particularly for projectors.

Another object is to assure a perfect and constant framing of the picture.

Still another object of the present invention is to avoid the use of an intermittent pull-down claw or the like mechanism to avoid damaging of the sprocket holes in the film.

Another object is to provide a machine without pressure shoe, thus avoiding scratching of the film.

Still a further object is to assure that the picture frame is fully adhered to the window to avoid the "ridging" or "buckling" of the film in front of the window due to the heat produced by the light source.

Another object according to the method of the present invention is to cool the film by the pneumatic arrangement which forms part of the forward moving means of the film, whereby an additional safety factor is provided against the above mentioned "ridging" or "buckling."

Another object is to provide a camera or a projector which works with less noise, therefore is a better arrangement in relationship to sound capture and sound reproduction. In addition the wear and tear of the machine is considerably reduced due to the fact that there is no intermittent motion and due to the fact that the vibrations as such are substantially reduced, which is particularly important in the case of projectors.

Still a further object is to provide an arrangement of low manufacturing cost in comparison with the known Maltese cross or intermittent pull-down claw arrangements which require a high manufacturing precision coefficient and constant service care.

Still another object is to provide an arrangement wherein the threading of a film is simpler, requires a smaller number of operations since no upper loop, no picture gate opening and other operations, as will be apparent later on, are required.

These and further objects and advantages of the present invention will become more apparent during the course of the following description, wherein reference is made to several specific embodiments, by way of example, in relationship to the accompanying drawings, wherein:

FIG. 2 is an exploded perspective view of a fly wheel, shutter and associated pneumatic arrangement forming part of the device shown in FIG. 1.

FIG. 3 is a section along line III—III of FIG. 1.

FIG. 4 is a front view of the aperture plate, front plate, window and associated parts.

FIG. 5 is a bottom plan view, partially in section, of the upper and lower roller arrangements and associated parts.

FIG. 6 is a top plan view of the upper roller means shown in FIG. 5 but above the main frame body and with an additional stationary but adjustable framing claw.

FIG. 7 shows the upper roller means of FIGS. 5 and 6, in section, but turned through 90°.

FIG. 8 is a detail in top plan view of the control means for the framing claw.

FIG. 9 is a schematic longitudinal section of an alternative embodiment for substandard projectors having a slidable framing window in lieu of the framing claw.

FIGS. 10 and 11 are schematic lay-outs, which in combination with FIG. 3 enable to explain a complete cycle or turn of the fly wheel and associated parts.

FIG. 12 is a similar longitudinal section as FIG. 1 of an alternative embodiment having mechanical instead of pneumatic means.

FIG. 13 is a section along line XIII—XIII of FIG. 12.

FIG. 14 is a similar view as FIG. 13 but showing the pressure discs in a different position.

FIG. 15 is a similar view as FIG. 14, but of still another embodiment having a stationary pneumatic ejector arrangement.

FIG. 16 is a similar sectional view as FIG. 1, but of the embodiment of FIG. 15.

FIG. 17 is an end view along line XVII—XVII of FIG. 16.

FIG. 18 is a detail of the mechanism shown in FIG. 16.

FIG. 19 is a detail of the mechanism shown in FIG. 16.

FIG. 20 is a detail of the mechanism shown in FIG. 18.

Figure 1:
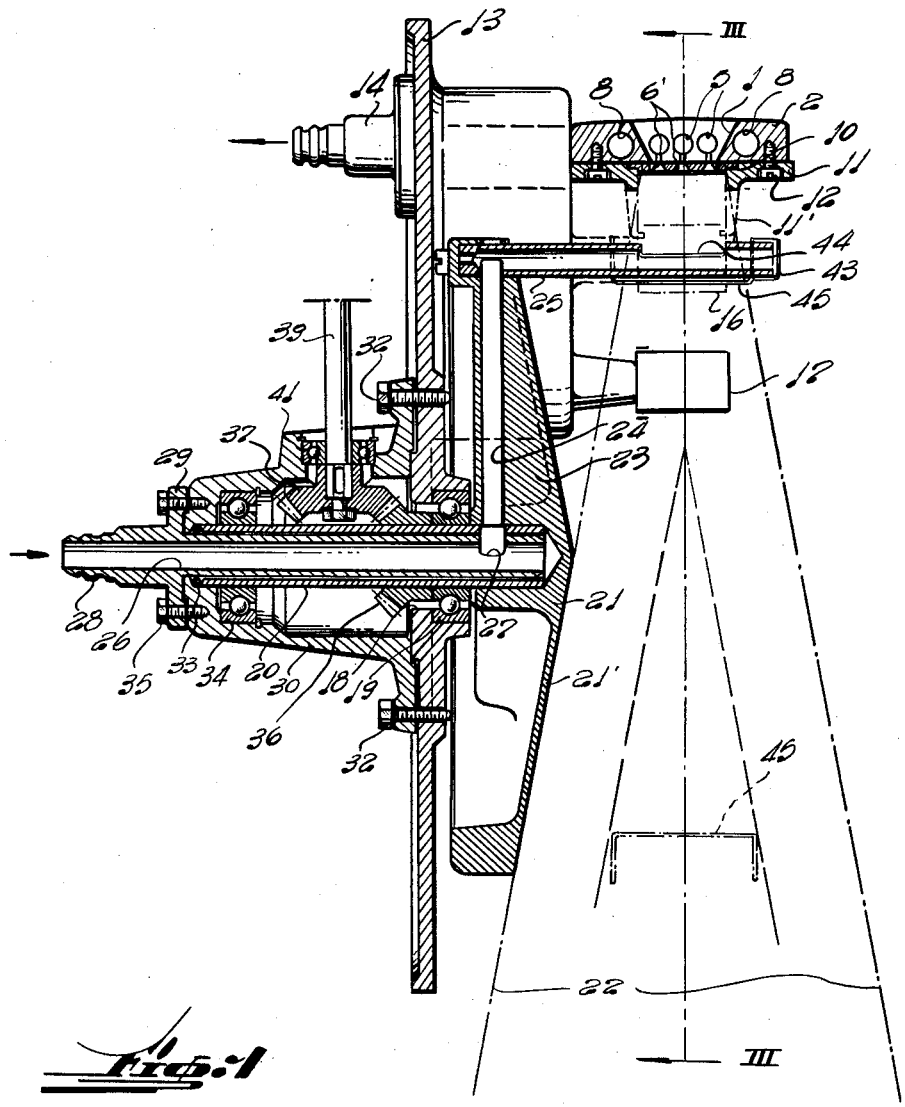
FIG. 1 is a longtiudinal section through a driving device for a motion picture film, according to the present invention.

The driving device for a motion picture film in accordance with the present invention will now be described in relationship to a projector although the same principle, as will be apparent to anybody skilled in the art, may be applied to a camera and therefore the reference to a projector is not restrictive.

As may be appreciated in FIGS. 1 and 3, the projector comprises a window 1 arranged in an aperture plate 2 defining an upper portion 3 above the window 1 and a lower portion 4 below the window 1 (FIG. 3). In this particular embodiment (see also FIG. 4), the upper portion comprises three longitudinal channels 5 having a plurality of spaced apart suction nozzles 6. Similarly, the lower portion 4 has longitudinal channels 5' and suction nozzles 6'. A cross-channel 7 links the longitudinal channels 5, and a cross-channel 7' links the longitudinal channels 5'.

A pair of outer channels 8 links the cross-channels 7 and 7'.

As may be seen in FIG. 3 each of the longitudinal channels 5 is formed by a pair of intercrossing channels 5a and 5b each closed by a plug 9, thus providing a simple manner to obtain a curved longitudinal channel 5 which follows the shape of the upper portion 3. Likewise the longitudinal channel 5' is closed by a plug 9'. It will be appreciated that each channel 5b and each channel 5' ends in a suction nozzle 6a and 6b (FIGS. 3 and 4), respectively, near the window 1.

Actually, the aperture plate 2 consists of three bodies, namely, the upper portion 3, the lower portion 4 and a front plate 10, having the same openings and nozzles, linked together by a pair of stepped guide rails 11 (FIG. 1) and screws 12.

The assembly so far described, as is already known in the art, is supported by a main frame body 13, here only shown as a plate. A suction nipple 14 is mounted on said main frame body 13 and connected through a prolongation 7" (FIG. 4) to the cross-channel 7'. Thus it will already be understood, that if a suction tube (not shown) is applied to nipple 14, that all the suction nozzles 6, 6', 6a and 6b will exert a suction on a film 15 (FIG. 3) which is arranged on the front plate 10, as will be later apparent.

The main frame body 13 further supports an upper roller 16 and a lower roller 17, which may be sprocket rollers if the film 15 has sprocket holes. These upper and lower rollers 16 and 17 provide the means for feeding the film 15, as is already known, and reference will again be made thereto when analizing FIGS. 5 to 8.

The main frame body 13 (FIGS. 1 and 2) has a central bore 18 housing a ball-bearing 19 (only shown in FIG. 1) to rotatably support a hollow shaft 20 pressure fit into a fly wheel 21 having a conical front face 21' in order to be out of the way of or limit the ray-beam 22 emerging out of the window 1.

The fly wheel comprises three 120° spaced apart radial reinforcement ribs 23, of which one has a radial bore 24 ending at one end into the hollow shaft 20, while the other end ends in a tubular projecting member 25.

A stationary fluid supply tube 26 is arranged inside the hollow shaft 20 and has an oblong window 27 at one end portion and is integral with a nipple 28 having a flange 29 at the other end. A cover cup 30 having a flange 31, is mounted on the main frame body 13 by means of screws 32 and an O-ring 33 (FIG. 1) seals the inside of the stationary supply tube 26 from the outside, so that it is assured that the fluid, usually air under pressure, supplied through the nipple 28, will move forward into the tubular projecting member 25 without any leakage. A second ball-bearing 34 mounted in the cover cup 30 likewise supports the hollow shaft 20 for rotation. Screws 35 secure the flange 29 onto the cover cup 30.

A bevelled transmission-gear 36 is keyed onto the hollow shaft 20 and meshes with the pair of bevelled gears 37 and 38 (the latter is not shown in FIG. 1, but in FIG. 5). Each of the bevelled gears 37 and 38 is mounted on a transmission shaft 39, 40, each rotatably housed in a ball-bearing 41, 42, respectively, which are in driving relationship with the previously mentioned upper and lower rollers 16, 17, as will be later seen.

The free end of the tubular projecting member 25 is sealingly closed by a cap 43 (FIGS. 1 and 2) and above said cap 43 said tubular projecting member has an ejector slot 44 directed towards said front plate 10 of said aperture plate 2. The length of said ejector slot 44 is preferably equal to the width of the film for instance 35 mm. if a standard film is used. A shutter plate 45 is mounted on said tubular projecting member 25 and further supported by a column 46 (FIG. 2) likewise connected to said fly wheel 21 in such a way that the size of the shutter will be able to *close* the window 1 when facing the latter.

It may already be understood that when the fly wheel 21 rotates, during each rotation of 360° the shutter 45 will once face the window 1 and once be diametrically opposed thereto as indicated in dotted lines in FIG. 1, in which position only approximately an 8.3% of luminosity is lost in view of the fact that only 30° of 360° are shut off.

As may be appreciated in FIG. 5, the transmission shaft 39 enters a housing 47 in which a further ball-bearing 48 journals the transmission shaft 39 which projects through said housing 47 and ball-bearing 48 to be connected to a driving source (not shown), such as an electric motor. Within housing 47 a worm 49 is keyed on the transmission shaft 39 and meshes with a worm gear 50 mounted on a shaft 51 on which the previously mentioned lower roller 17 (FIG. 3) is keyed, thereby being able to move the film 15 forward.

The transmission shaft 40 (FIG. 5) likewise enters a housing 52 mounted on the main frame body 13. The free end portion of shaft 40 comprises at least one longitudinal key 53 on which a worm 54 is slidably mounted and ending in a stub shaft 55 mounted in a ball-bearing 56 connected to the hollow bushing 57 of a hand-wheel 58 having a handle 59. The outer face of the bushing 57 has an external screw thread 60 which is screwed into a collar 61 of the housing 52.

The worm 54 meshes with a worm gear 62 mounted on a shaft 63 which emerges out of the housing 52 and supports the upper roller 16 (FIG. 3).

If the picture of the film is to be framed all that is necessary is to operate the handle 59, whereby the worm 54 is slid on the shaft 40 thus rotating by way of adjustment the worm gear 62 which will adjust the upper buckle A of the film as will be apparent later on.

The main frame body 13 (FIG. 7) supports on the opposite side with regard to the housing 52 a further housing 64 in which a bearing 65 supports a shaft 66 projecting out of the bearing on both sides, and supporting at one end a gear 67 passing through a slot 68 in the main frame body 13 and meshing with a crown gear 69 of the hand-wheel 58. The width of the gear 67 is such that the crown gear 69 always meshes with the gear 67 in spite of the forward and backward movement the hand-wheel 58 may carry out.

The other end of the shaft 66 supports a straight bevel gear 70 meshing with a crown sector 71 (see also FIG. 8) slidably movable in a guide 72 (FIG. 7). The crown sector 71 comprises a free end portion 71' (FIG. 8) on which a projecting arm 73 (FIG. 7) is mounted, supporting a perpendicularly projecting frame claw 74 (FIGS. 6, 7, 8)

which claw is so arranged as to be located in the path of the film 15 (FIG. 7).

This claw is of course only used in those cases where a film with perforations is used. If a special film is made for the present invention, then one perforation per picture frame would be sufficient.

It will thus be understood that when the handle 59 is turned, that the frame claw 74 will slide along the upper portion 3 or more particularly the pertinent portion of the front plate 10. The purpose of the frame claw 74 will be later on explained.

In case of using a substandard projector or an amateur projector, the arrangement of the frame claw and associated parts is too complicated and expensive and in this event the alternative embodiment, as schematically shown in FIG. 9, could be used, wherein the upper portion 3 of the aperture plate 2 comprises in front of the window 1 a movable frame 75 to be operated by the framing knob 76 which is screwed into the screw threaded end portion 77 of the rod 78, integral with the movable frame 75. Since such an arrangement is already well known in the art, it is not believed necessary to further enter into details thereabout.

As to the operation of the driving device for a motion picture film in accordance with the present invention, it will be understood that the electric motor (not shown) drives in a continuous manner. The transmission shaft 39 (FIG. 5) simultaneously drives through the bevelled gears 37, 36 and 38, the upper roller 16 through shaft 63, the fly wheel 21 through bevelled gear 36 and the lower roller 17 through shaft 51.

Prior to threading the film 15, nipples 28 and 41 are respectively connected to an air ejector and to a suction device and then the film 15 is easily slid under the upper roller 16 simply passed along the front plate 10 leaving preferably a lower loop 79 (FIG. 3) and then sliding it under the lower roller 17. As soon as suction is started, and even if the electric motor is still not rotating, the film 15 will adhere to the front plate 10 along its entire height. Obviously, the film 15 is supplied from an upper film reel (not shown) and may pass either before or after the lower roller 17 through a sound-optical arrangement (not shown) before entering the lower reel (not shown) as is already well known by those skilled in the art.

If the arrangement comprises a frame claw 74, then during the threading operation attention will have to be paid in inserting one perforation of the film in said claw, as shown in FIG. 7.

As soon as the electric motor (not shown) starts to rotate, the upper roller 16 will start to rotate and thereby start to form a film buckle in the following manner: The portion of the film in front of front plate 10, does not move in view of the suction and adherance to said front plate 10, but since further film is supplied by the upper roller 16 the film portion adhered to the front plate 10 near the upper roller 16 is lifted in spite of the suction effect from the front plate thus forming a buckle A which continuously increases until reaching a predetermined maximum size which corresponds to the position as shown in FIG. 10. At the same time the lower loop 79 gradually decreases due to the continuous rotation of the lower roller 17. In the position shown in FIG. 10 the ejector slot 44 establishes its jet connection through oblong window 27 and its jet is directed towards the axis of rotation of the upper roller 16 and as the rotation of the fly wheel 21 continues, the jet ejected through the ejector slot 44 moves forward thereby adhering the upper end portion A' against the top end portion of the front plate 10 and since the jet continues its rotary movement the buckle A is moved forward like a wave and will pass the window 1, as shown in FIG. 3 which is precisely the moment the picture frame is changed and during which change the shutter plate 45 covers the window 1. As the jet continues its rotation, the ejector slot 44 reaches the position, as schematically shown in FIG. 11, where the buckle A will reach the lower end portion of the front plate 10 and thus forming part of the lower loop 79 which is thereby suddenly increased in size and which is continuously wound up by the lower roller 17, as previously explained.

During the period the buckle A has moved from the upper roller 16 towards the lower end of the front plate 10, as shown in FIGS. 10, 3 and 11, and bearing in mind that the upper roller 16 continuously supplies additional film, a second buckle B starts to form, as shown in FIG. 3, and will fit into the claw 74 (see FIGS. 6, 7 and 8), thereby providing an adjustment. If FIG. 3 is compared with FIG. 11 it may be appreciated that in FIG. 11 the buckle B has already been increased in size.

The ejection time of the jet is controlled by the length of the oblong window 27 (FIGS. 1 and 2) which supplies air under pressure through nipple 28 passing into the radial bore 24 as long as said radial bore is facing part of the oblong window 27 (see FIG. 2).

As the ejector slot 44 continues its rotation with regard to FIG. 11, there is no object in further ejecting air until again reaching the position shown in FIG. 10 and while the rotation of the flywheel 21 and associated parts continues the buckle adjacent the upper roller 16 increases its size so that a new cycle starts as soon as the ejector slot 44 reaches again the position shown in FIG. 10.

It will thus be appreciated that the film moves forward in a caterpillar fashioned movement and as soon as the buckle has passed the window 1 the film is adhered in an excellent way onto the window 1 due to the suction applied, particularly by the suction nozzles 6a and 6b.

If the picture is to be framed, all that is necessary, as previously explained, is to turn handle 59 (FIG. 7) whereupon the upper roller 16 and also the claw 74 (FIG. 8) if any, will move and likewise adjust thereby the buckle.

A more economic arrangement, which will probably be used for amateur projectors is shown in FIGS. 12 to 14, where the same reference numerals have been used to identify similar parts, as in the previously described arrangement, and therefore repetition becomes unnecessary. It will be appreciated that in this embodiment the hollow shaft 20 is not provided with any stationary supply tube and the cover cup 30 comprises an integral head 80. A fly wheel 21 supports a solid projecting member 81, instead of the tubular projecting member 25 of the previous embodiment, and the free end portion thereof supports two independent, freely rotatably pressure discs 82 and 83, retained by rings 84, 85 and 86. These pressure discs are adapted to press on the side edges of the film as will be easily understood by analizing FIGS. 13 and 13, so that when the discs 82 and 83 reach the position of FIG. 14, they will press the top end A' of buckle A onto the front plate and move the buckle A forward as is apparent by comparing FIGS. 14 and 13.

Obviously, the solid projecting member 81 further supports in combination with the column 46, a shutter 45. It is of course not necessary to provide the stepped gate rails with guides 11' as shown in FIG. 1.

The size of the discs 82 and 83 may vary within reasonable limits.

The total size of this projector is considerably smaller and the suction arrangement may be mounted within the projector and used likewise for refrigerating purposes.

So far the two embodiments described use movable means for pushing the buckle of the film forward along the front plate. It is however possible to replace said movable means by a stationary arrangement, whereby the embodiment becomes still smaller and more particularly with reference to FIG. 15 it may be appreciated that the center O' is considerably nearer to the front plate 10 than the center O of the embodiment of FIG. 3.

The parts of the new embodiment which are identical to those of the first embodiment have the same reference numerals and will therefore not be redescribed.

The transmission shafts 39 and 40 of this embodiment define a larger angle and the bevelled gears 37 and 38 likewise mesh with the bevelled transmission gear 36, only schematically shown. In addition, transmission gear 36 meshes with a third bevelled gear 87 driving a shutter operating shaft 88 journalled in the bearings 89 and 90 and passing through the housing 91 (see also FIG. 16). A shutter 92 (see also FIG. 17) which is of the orthodox shape is mounted on the shutter operating shaft 88, and is adapted to shut once every 360° of rotation the window 1. As may be seen in FIG. 16, the bearing 80 is mounted on a bracket 93, in turn supported by the main frame body 13 which in this embodiment further comprises an opening 116.

In this embodiment the cover cup 30 supports a nipple 28 by means of its flange 29 and screws 35, but said nipple has only a short stationary tube 26′ sealingly entering a hollow shaft member 95 by passing through O-ring 33. The hollow shaft member 95 is rotatably supported by ball-bearings 19 and 34 and ends in a cup shaped distributor 96 having a lateral distributor bore 97. The cup shaped distributor 96 is closed by an inner cap 98, the peripheral flange 98′ of which in combination with the peripheral flange 96′ houses a pair of sealing rings 101, 102. The outer periphery of which are in sealing contact with an outer stationary cap 103 (see also FIG. 19) mounted on the main frame body 13 by means of at least one screw 104 (FIG. 16). The cap 103 has a conical front face 103′, similar as the conical front face 21′ of the embodiment shown in FIG. 1 and for the same purpose.

The ring member 100 (FIG. 18) is screwed onto the cup shaped distributor 96 by a pair of diametrically opposed screws 105. The ring member 100 comprises a radial perforation 106 coaxial with the lateral distributor bore 97 (FIG. 16). Adjacent the radial perforation 106 (FIG. 18) a pair of blind slots 107 is arranged, each housing a parallelepipedic ceramic member 108 (FIG. 20), which by centrifugal force sealingly contacts the outer cap 103.

The outer cap 103 (FIG. 19) comprises in this embodiment three peripherical spaced apart distributor bores (only two visible) 109 and 110. The cap shaped member 103 (FIG. 15) is connected to a funnel shaped member 111 ending in an ejector member 112 having three spaced apart nozzles (not shown) defining the ejector axes 113, 114 and 115, schematically defined by arrows, respectively.

Buckle A of film 15 is again shown and when the hollow shaft member 95 rotates, fluid under pressure, supplied through nipple 28, will be successively ejected, first through the nozzle corresponding to ejector axis 113 to thereby adhere the end A′ of buckle A to the upper end portion of the front plate 10 and then successively air will be ejected through the nozzles corresponding to axes 114 and 115 and thereby the buckle A will move forward in accordance with the concept of the present invention.

It will be evident to those skilled in the art that as the cup shaped distributor 96 rotates, that air under pressure will be successively supplied to the three distributor bores (two of which are shown in FIG. 10, more particularly bores 109 and 110) which are obviously connected to the nozzles.

If desired, the number of distributor bores may be increased and the outer cap 103 may be connected to several funnel shaped members of the type as shown in FIG. 15 and identified by reference numeral 111, to thereby cover the entire front plate 10 (FIG. 15).

From the foregoing it is apparent that within the concept of the present invention, a number of modifications may be supplied as long as they fall within the scope of the appendant claims. For instance, the shutter may be arranged on the other side of the window, which is necessary in those cases where the driving device for a motion picture film is used for cameras.

It could likewise be conceived that the suction arrangement defined by the suction nozzles 6, 6′, 6a and 6b could be replaced for instance by some kind of electromagnetic arrangement, in which event the side edges of the film would require some kind of magnetizable layer, such as a thin, embedded, metallic strip.

We claim:

1. A driving device for a motion picture film along an aperture plate of a camera or projector, comprising an aperture plate having an upper portion and a lower portion, a window defined in said aperture plate between said upper portion and said lower portion, said upper portion including a top portion, continuous film feeding means for feeding film onto said top portion and along said aperture plate, means for retaining said film adhered along said aperture plate while said continuous film feeding means continuously feeds film to said top portion of said aperture plate to form an increasing buckle in said film adjacent said top portion, means for pressing the upper end portion of said buckle upon reaching a predetermined size onto said top portion, means for moving said buckle forward in a caterpillar-like movement, along said aperture plate over said upper portion, window and lower portion to thereby push forward said buckle while immobilizing, relative to said aperture plate, the portions of the film in advance of, and following the buckle, and shutter means adapted to shut said window upon said buckle passing by said window, said window remaining open at least part of the time the film is flat against the window.

2. A driving device for a motion picture film comprising an aperture plate having an upper portion and a lower portion, a window defined in said aperture plate between said upper portion and said lower portion, suction means in said upper portion and said lower portion adapted to immobilize a film onto said aperture plate by suction, said upper portion including a top portion, an upper roller adjacent said top portion, a lower roller spaced apart from said lower portion, driving means for continuously driving said upper and lower rollers, said film being adapted to pass over said upper roller and said lower roller, a rotary shaft, a transmission means mounted on said rotary shaft, said transmission means being connected to said driving means, said upper roller being adapted to continuously supply film and thereby forming an increasing buckle adjacent said top portion, said buckle having an upper end portion spaced apart from said top portion, means for pressing said upper end portion of said buckle upon reaching a predetermined size onto said top portion, means for moving said buckle forward in a caterpillar-like movement along said aperture plate over said upper portion, window and lower portion to thereby push forward said buckle while immobilizing, relative to said aperture plate, the portions of the film in advance of, and following the buckle, said last mentioned means being structurally related to said rotary shaft, and shutter means synchronized with said driving means through said rotary shaft adapted to shut said window upon said buckle passing by said window, said window remaining open at least part of the time the film is flat against the window.

3. The driving device as claimed in claim 2, wherein said driving means comprises a transmission shaft, a worm rotatably and slidably mounted on said transmission shaft, a stub shaft integral with said worm and in axial alignment with said transmission shaft, a ball-bearing being further keyed in said bushing, a casing having a collar, said bushing being slidably arranged in said collar, a worm gear in said housing and meshing with said worm, a shaft for said worm gear, said upper roller being mounted on said shaft, and hand controllable means for sliding said bushing in said housing.

4. The driving device as claimed in claim 3, wherein a hand wheel is integral with said bushing, a crown gear mounted on said hand wheel, a bearing, a shaft rotatably mounted in said bearing, a gear keyed on said shaft and meshing with said crown gear, a straight bevel gear keyed on said shaft, a crown sector meshing with said straight bevel gear and being slidably arranged in the vicinity of said top portion of said aperture plate, an arm projecting out of said crown sector, a frame claw projecting out of said arm, said film having sprocket holes, said frame claw being arranged in the path of said sprocket holes.

5. A driving device for a motion picture film, comprising an aperture plate having an upper portion and a lower portion, a window defined in said aperture plate between said upper portion and said lower portion, suction means in said upper portion and said lower portion adapted to immobilize a film onto said aperture plate by suction, said upper portion including a top portion, an upper roller adjacent said top portion, a lower roller spaced apart from said lower portion, said film being adapted to pass over said upper roller along said aperture plate then forming a lower loop and pass over said lower roller, a stationary supply tube for supplying fluid under pressure, a hollow shaft sealingly and rotatably mounted on said stationary supply tube, said hollow shaft having a free end portion, a fly wheel rigidly mounted on said free end portion, a radial bore in said fly wheel and passing through said hollow shaft, an oblong window in said stationary supply tube in front of said radial bore so that upon rotating said fly wheel through 360° during part of its rotary movement said radial bore is connected through said oblong window with said stationary supply tube, a tubular projecting member supported by said fly wheel and connected to said radial bore, an ejector slot in said tubular projecting member directed towards said aperture plate and said window upon said tubular projecting member passing in front of said aperture plate during the rotation of said fly wheel, a transmission gear mounted on said hollow shaft, a first gear and a second gear each meshing with said transmission gear, a first transmission shaft and a second transmission shaft, said first transmission gear being keyed on said first transmission shaft and said second transmission gear being keyed on said second transmission shaft, said first transmission shaft being in driving relationship with said upper roller, said second transmission shaft being in driving relationship with said lower roller, said upper roller being adapted to continuously supply film and thereby forming an increasing buckle adjacent said top portion, said buckle having an upper end portion spaced apart from said top portion said fluid under pressure being capable of pressing said upper end portion of said buckle upon said ejector slot facing said top portion onto said top portion and then moving said buckle forward in a caterpillar-like movement along said aperture plate over said upper portion, window and lower portion as the fly wheel rotates while immobilizing, relative to said aperture plate, the portions of the film in advance of, and following the buckle, shutter means supported by said tubular projecting member adapted to shut said window upon said buckle passing by said window, said window remaining open at least part of the time the film is flat against the window, and driving means connected to said second transmission shaft.

6. The driving device as claimed in claim 5, wherein said fly wheel has a conical front face arranged in limiting relationship with regard to the ray beam emerging out of said window.

7. The driving device as claimed in claim 5, wherein said upper portion and said lower portion of said aperture plate each have a plurality of longitudinal channels, suction nozzles in said longitudinal channels facing said film, cross-channels connecting said longitudinal channel of said upper portion and said lower portion respectively, at least one outer channel connecting said cross-channels, a suction source, nipple means connected to said outer channel adapted to be connected to said suction source, a top plate having a window and mounted on said upper portion and lower portion and coinciding with said window of said aperture plate and having perforations coinciding with said suction nozzles, said top plate defining a surface on which said film is adapted to move, and a pair of guide rails mounted on said front plate at least in front of said window.

8. The driving device as claimed in claim 7, wherein said pair of guide rails are stepped guide rails with side guides adapted to prevent the film from separating more than a predetermined distance from said front plate.

9. A driving device for a motion picture film having side edges, comprising an aperture plate having an upper portion and a lower portion, a window defined in said aperture plate between said upper portion and said lower portion, suction means in said upper portion and said lower portion adapted to immobilize a film on said aperture plate by suction, said upper portion including a top portion, an upper roller adjacent said top portion, a lower roller spaced apart from said lower portion, said film being adapted to pass over said upper roller along said aperture plate, then forming a lower loop and pass over said lower roller, a rotary shaft, a fly wheel rigidly mounted on said rotary shaft, a solid projecting member supported by said fly wheel and spaced apart from said rotary shaft, a pair of spaced apart freely rotatable pressure discs mounted on said projecting member and directed towards said aperture plate and said window upon said projecting member passing in front of said aperture plate during rotation of said fly wheel, a transmission gear mounted on said rotary shaft, a first gear and a second gear each meshing with said transmission gear, a first transmission shaft and a second transmission shaft, said first transmission gear being keyed on said first transmission shaft and said second transmission gear being keyed on said second transmission shaft, said first transmission shaft being in driving relationship with said upper roller, said second transmission shaft being in driving relationship with said lower roller, said upper roller being adapted to continuously supply film and thereby forming an increasing buckle adjacent said top portion, said buckle having an upper end portion spaced apart from said top portion, said pressure discs being capable of pressing the side edges of said upper end portion of said buckle onto said top portion upon said pressure discs facing said top portion and then moving said buckle forward in a caterpillar-like movement along said aperture plate over said upper portion, window and lower portion while immobilizing, relative to said aperture plate, the portions of the film in advance of, and following the buckle, as the fly wheel rotates, shutter means supported by said tubular projecting member adapted to shut said window upon said buckle passing by said window, said window remaining open at least part of the time the film is flat against the window, and driving means connected to said second transmission shaft.

10. The driving device as claimed in claim 9, wherein said fly wheel has a conical front face arranged in limiting relationship with regard to the ray beam emerging out of said window.

11. The driving device as claimed in claim 9, wherein said upper portion and said lower portion of said aperture plate each have a plurality of longitudinal channels, suction nozzles in said longitudinal channels facing said film, cross-channels connecting said longitudinal channel of said upper portion and said lower portion respectively, at least one outer channel connecting said cross-channels, a suction source, nipple means connected to said outer channel adapted to be connected to said suction source, a top plate having a window and mounted on said upper portion and lower portion and coinciding with said window of said aperture plate and having perforations coinciding with said suction nozzles, said top plate defining a surface on which said film is adapted to move, and a pair of guide rails mounted on said front plate at least in front of said window.

12. A driving device for a motion picture film comprising an aperture plate having an upper portion and a lower portion, a window defined in said aperture plate between said upper portion and said lower portion, suction means in said upper portion and said lower portion adapted to immobilize a film onto said aperture plate by suction, said upper portion including a top portion, an upper roller adjacent said top portion, a lower roller spaced apart from said lower portion, said film being adapted to pass over said upper roller along said aperture plate, then forming a lower loop and pass over said lower roller, a stationary supply tube for supplying fluid under pressure, a hollow shaft sealingly and rotatably mounted on said stationary supply tube, a cup shaped distributor integral with said hollow shaft, a lateral distributor bore in said cup shaped distributor, an inner cap mounted on said cup shaped distributor and defining with said cup shaped distributor a central annular recess, a ring member mounted on said annular recess, a radial perforation in said ring member coaxial with said lateral distributor bore, an outer stationary cap enclosing said cup shaped distributor and inner cap, said outer cap having peripherical spaced apart distributor bores, said radial perforation being capable of successively facing said distributor bores, an ejector nozzle for each distributor bore having different ejection axes facing successive portion of said aperture plate from said top portion towards said lower portion, a transmission gear mounted on said hollow shaft, a first gear, a second gear and a third gear each meshing with said transmission gear, a first transmission shaft, a second transmission shaft and a shutter operating shaft, said first transmission gear being keyed on said first transmission shaft, said second transmission gear being keyed on said second transmission shaft, said third transmission gear being keyed on said shutter operating shaft, said first transmission shaft being in driving relationship with said upper roller, said second transmission shaft being in driving relationship with said lower roller, a shutter mounted on said third transmission shaft adapted to shut and open said window, said upper roller being adapted to continuously supply film and thereby forming an increasing buckle adjacent said top portion, said buckle having an upper end portion spaced apart from said top portion, one of said ejector nozzles being capable of fluid pressing said upper end portion of said buckle onto said top portion and the remaining nozzles being adapted to move said buckle forward along said aperture plate over said upper portion, window and lower portion as the hollow shaft rotates while immobilizing, relative to said aperture plate, the portions of the film in advance of, and following the buckle, said shutter being synchronized to shut said window upon said buckle passing by said window, said window remaining open at least part of the time the film is flat against the window, and driving means connected to said second transmission shaft.

13. The driving device as claimed in claim 13, wherein said outer cap has a conical front face arranged in limiting relationship with regard to the ray beam emerging out of said window.

14. The driving device as claimed in claim 13, wherein said upper portion and said lower portion of said aperture plate each have a plurality of longitudinal channels, suction nozzles in said longitudinal channels facing said film cross-channels connecting said longitudinal channel of said upper portion and said lower portion respectively, at least one outer channel connecting said cross-channels, a suction source, nipple means connected to said outer channel adapted to be connected to said suction source, a top plate having a window and mounted on said upper portion and lower portion and coinciding with said window of said aperture plate and having perforations coinciding with said suction nozzles, said top plate defining a surface on which said film moves, and a pair of guide rails mounted on said front plate at least in front of said window.

15. A method for moving a motion picture film in front of a window in an aperture plate of a camera or projector comprising the steps of continuously feeding film toward the top of the aperture plate, forming a buckle in said film against said aperture plate and above said window while maintaining a portion of the film flat against said window, moving said buckle downwardly along said aperture plate past said window in a caterpillar-like movement and obstructing said window when said buckle passes said window, said window being unobstructed at least part of the time said film is flat against said window.

16. A method for moving a motion picture film in front of a window in an aperture plate of a camera or projector comprising the step of adhering a portion of said film to said aperture plate against and above said window, continuously feeding said film toward the top of said aperture plate while maintaining said portion of said film adhered to said aperture plate to form an increasing buckle in said film adjacent the top of said aperture plate, then when the buckle has reached a predetermined size, adhering the upper end of said buckle onto the top of said aperture plate and moving said buckle downwardly along said aperture plate past said window in a caterpillar-like movement while adhering to said aperture plate portions of said film in advance of, and following said buckle, and obstructing the front of said window when said buckle passes over said window, said window being unobstructed at least part of the time said film is flat against said window.

17. A method for moving a motion picture film as claimed in claim 16, wherein said film is adhered along said aperture plate by suction.

18. A method as claimed in claim 17, wherein said upper end of said buckle is adhered to the top of said aperture plate by means of air pressure.

19. A method as claimed in claim 18, wherein said air pressure is formed by blowing air against said upper end of said buckle.

20. A method as claimed in claim 17, wherein said upper end of said buckle is adhered by mechanically pressing said upper end against said aperture plate.

21. A device for driving motion picture film along an aperture plate of a camera or a projector comprising an aperture plate having an upper portion and a lower portion, said aperture plate having a window therethrough between said upper and lower portions, means for continuously feeding film onto said upper portion of the aperture plate, means for forming a buckle in said film adjacent said aperture plate above said window, means for moving said buckle downwardly along said aperture plate past said window in a caterpillar-like movement while immobilizing, relative to said aperture plate, the portions of the film in advance of, and following the buckle, and a shutter for obstructing said window when said buckle passes said window, said window remaining open at least part of the time the film is flat against the window.

References Cited in the file of this patent
UNITED STATES PATENTS

| | | |
|---|---|---|
| 1,244,920 | Thomas | Oct. 30, 1917 |
| 1,770,659 | Oehmichen | July 15, 1930 |
| 2,447,131 | McDermott | Aug. 17, 1948 |
| 2,560,919 | Bedford | July 17, 1951 |
| 2,892,379 | Cooper | June 30, 1959 |